US005277809A

United States Patent [19]

Eder

[11] Patent Number: 5,277,809

[45] Date of Patent: Jan. 11, 1994

[54] CENTRIFUGE WITH AN ECCENTRICALLY MOUNTED WORM FOR TRANSPORTING SOLIDS

[76] Inventor: Wolfgang Eder, Am Rahlbusch 6, 3340 Wolfenbuettel, Fed. Rep. of Germany

[21] Appl. No.: 801,777

[22] Filed: Dec. 6, 1991

[30] Foreign Application Priority Data

Dec. 6, 1990 [DE] Fed. Rep. of Germany ....... 4038954

[51] Int. Cl.[5] ............................................ B01D 35/16

[52] U.S. Cl. ................................ 210/380.1; 210/107; 210/396; 210/397; 210/512.1; 494/53; 494/54; 494/55; 494/56

[58] Field of Search .................. 210/107, 360.1, 380.1, 210/396, 397, 512.1; 494/53-56

[56] References Cited

U.S. PATENT DOCUMENTS 2,435,623 2/1948 Forsberg .............................. 494/55
4,073,431 2/1978 Jäger .................................... 494/53
4,432,148 2/1984 Darbonne et al. ....................... 34/58
4,449,967 5/1984 Caldwell ............................... 494/55
4,729,830 3/1988 Suzuki .................................. 494/53

FOREIGN PATENT DOCUMENTS 369195 10/1929 United Kingdom .

*Primary Examiner*—Robert A. Dawson
*Assistant Examiner*—David Reifsnyder
*Attorney, Agent, or Firm*—Foley & Lardner

[57] ABSTRACT

The invention relates to a process and a centrifuge for removing solids located on a cylindrical casing wall (3) of a rotating centrifuge, in particular solids precipitated in the centrifuge from a liquid-solid mixture, to a solids exit opening (6) by sweeping the entire casing inner wall (9) in the direction of the solids exit opening (6). In order to reduce clogging, it is proposed according to the invention that in each case the casing inner wall (9) is swept in strips up to the solids exit opening (6), during one sweep up to the solids exit opening (6) only a part of the casing inner wall (9) is swept, and after a certain time the entire casing inner wall (9) is swept by strips (11) swept sequentially in time.

25 Claims, 2 Drawing Sheets

CENTRIFUGE WITH AN ECCENTRICALLY MOUNTED WORM FOR TRANSPORTING SOLIDS

BACKGROUND OF THE INVENTION

The invention relates to a process for removing solids located on a cylindrical casing wall of a rotating centrifuge, in particular solids precipitated in the centrifuge from a liquid-solid mixture. The solids are removed to a solids exit opening by sweeping the entire casing inner wall in the direction of the solids exit opening. The invention also relates to a centrifuge for carrying out this process, having a rotating casing wall and a transport device which sweeps the casing inner wall towards the solids exit opening for the purpose of removing the solids.

The precipitation of solids in a liquid-solid mixture through the use of centrifugal force is known, in particular, in the metal-processing industry. In a rotating casing wall, solids of a mixture introduced beforehand are precipitated on the casing inner wall because of the higher density, and are then removed by a transport device towards a solids exit opening. In known centrifuges, the transport devices are formed by worms which rest with their radial outer rim on the casing wall and sweep the latter owing to a slight difference in rotational speed with reference to the casing wall. A problem is posed by the danger of clogging, which can lead to blocking of the worm. Automatic increase of the worm speed is provided in the prior art as a countermeasure against clogging, and this requires special outlay on control measures.

SUMMARY OF THE INVENTION

It is an object of the present invention to provide an improved process for removing solids located on a cylindrical casing wall of a rotating centrifuge.

It is a particular object of the invention to provide such a process in which the danger of clogging is prevented with simple means.

It is also an object of the invention to provide an improved apparatus for carrying out the process of the invention.

In accomplishing the objects of the present invention, there has been provided according to one aspect of the invention a process for removing solids located on a cylindrical casing wall of a rotating centrifuge, comprising the step of sweeping the entire casing inner wall in the direction of a solids exit opening, wherein the casing inner wall is swept in respective discrete strips up to the solids exit opening, wherein during each single sweep up to the solids exit opening only a part of the casing inner wall is swept, and wherein respective strips are swept in a selected order such that after a predetermined time the entire casing inner wall is swept.

According to another aspect of the present invention, there has been provided a centrifuge for carrying out the process as defined above, comprising: a rotating casing wall having a solids exit opening therein; and a transport device which sweeps the casing inner wall towards the solids exit opening for the purpose of removing solids, wherein the transport device comprises a member ending in a narrow region positioned at a preselected minimum distance in front of the casing inner wall and sweeps the casing inner wall with said narrow region in strips up to the solids exit opening, and means for producing a relative movement of the member with respect to the rotating casing inner wall.

Further objects, features and advantages of the invention will become apparent from the detailed description of the invention which follows, when considered together with the figures of drawing.

BRIEF DESCRIPTION OF THE DRAWINGS

Some preferred embodiments of the invention serving as an example are represented diagrammatically in the drawings, wherein.

DETAILED DESCRIPTION OF THE PREFERRED EMBODIMENTS

Figure 1:
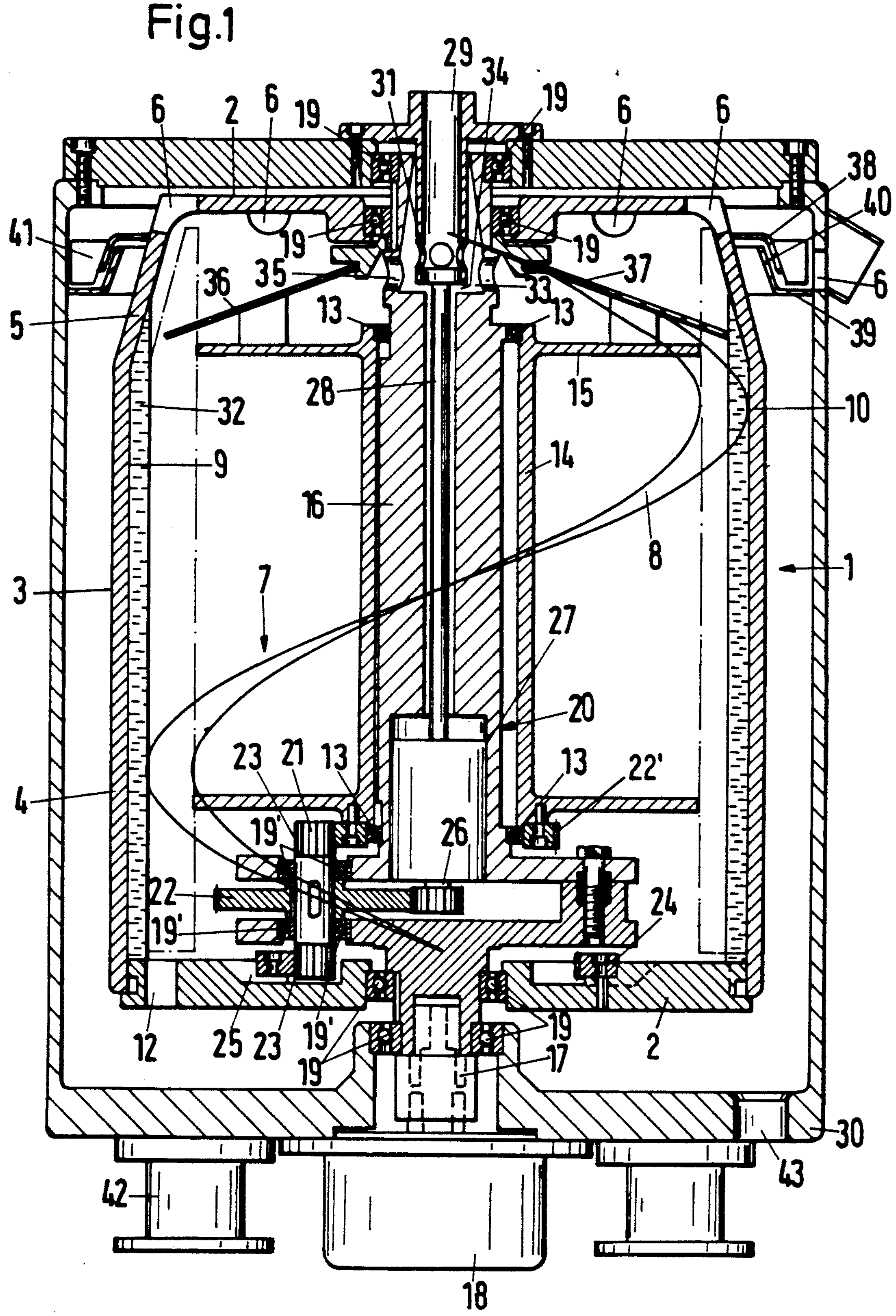
FIG. 1 shows a centrifuge in longitudinal section.

According to the invention, a process of the type mentioned in the introduction is provided in which the casing inner wall is swept respectively in strips up to the solids exit opening, during one sweep up to the solids exit opening only a part of the casing inner wall is swept, and after a certain time the entire casing inner wall is swept by strips swept sequentially in time.

In contrast with previously known processes, by means of this process the solids precipitated on the casing inner wall are transported in strips to a solids exit opening, and it is not until after a multiplicity of strips are swept sequentially in time that the precipitated solids on the casing inner wall are removed. In this process, unlike in the prior art, the entire casing inner wall is not swept by the entire rim of the transport device during a conveying period, but the casing inner wall is swept by a multiplicity of strips, so that in each case only a part of the solids adhering to the casing inner wall need be transported, and this substantially reduces the danger of clogging.

The transport path of the solids on the casing inner wall can be kept short when the strips are formed on the casing inner wall with a slight curvature essentially in the axial direction.

It is expedient for the purpose of reducing imbalances if the strips swept sequentially are spatially offset by an angle $90° \leqq \alpha \leqq 270°$. In an advantageous embodiment, the strip width is chosen such that the number of strips completely covering the casing inner wall is chosen between 20 and 100, preferably approximately 60.

Furthermore, according to the invention the objects are achieved using a centrifuge in which the transport device ends in a narrow region at a minimum distance in front of the casing inner wall and sweeps the casing inner wall with this region in strips up to the solids exit opening by means of a relative movement with respect to the rotating casing inner wall. In this case, a narrow region is understood as meaning a fraction of the circumferential line of the casing inner wall. An axial relative movement of the narrow region, which ends at a minimum distance in front of the casing inner wall, leads to the sweeping of the casing inner wall in strips.

The result of such a configuration is that the use of blocking protection of the transport device can be eliminated if appropriate, and the period between individual servicings or cleanings is substantially reduced.

It is expedient for the transport device to be formed by an eccentrically mounted worm, so that continuous transport of the solids through a narrow region of the worm rim is guaranteed. The eccentric bearing preferably rotates at a low speed relative to the rotating casing wall. Because of the eccentric bearing of the worm, the narrow region with which the solids are removed in strips is formed by the worm only with a small section of the worm rim. In a centrally mounted worm, such as has been used in the prior art, transport of solids takes place over the entire rim of the worm, as a result of which the forces to be applied are substantially higher and heavier rotating components are required. Owing to the removal of the solids in strips, it is possible in the centrifuge according to the invention to use lighter rotating components, so that smaller torques occur and less powerful drives suffice.

A structurally simple design can consist in that the worm has a complete worm thread. It can be guaranteed in this way that it is not until after termination of a strip that a further strip begins. In this case, a strip begins offset spatially by a constant angle with respect to the preceding strip.

The use of a common drive for the worm and the casing wall is expedient for realizing the slight difference in speed by means of a gear.

The drive can be connected to a spindle via which it is possible to transmit force in a particularly simple fashion to the worm and the casing wall when the rotation of the worm and the casing wall are derived from the spindle rotation.

The transmission of force from the drive to the rotating components is realized in a particularly simple fashion when an eccentric shaft is used which rotates at a low speed about its axis together with the spindle and drives both the worm and the casing wall in a rotary fashion.

In a preferred embodiment, the worm and the casing wall can be driven with the sum and the difference of the speeds of the shaft and spindle. It is advantageous for the setting of the rotational speed to be approximately 1000 rpm for the spindle, and for the rotational speed of the worm to be 1 rpm higher and that of the casing wall 1 rpm lower than that of the spindle.

The addition and subtraction of the speeds of the shaft and spindle are particularly easy to convert in structural terms when the shaft has teeth, and the teeth of the casing wall and worm mesh with the teeth of the shaft in a radially external or radially internal fashion. In this case, importance attaches only to the engagement of the teeth of the casing wall and worm on radially opposite sides of the shaft. Whether the casing wall or the worm rotates more quickly than the spindle can be freely chosen, but the drive direction and the sense of rotation of the worm must be chosen to be tuned with respect to one another. The teeth of the casing wall are preferably 179 in number, those of the worm preferably 143.

In an advantageous embodiment, the shaft has teeth at its ends in each case. The teeth of the shaft are preferably 23 in number.

The low difference in rotational speed between the worm and the casing inner wall can be achieved by means of only one drive when the shaft can be driven in a rotary fashion by an output drive of a planetary gear which has a planet wheel connected to the rotating spindle.

It is a simple structural possibility for the sun wheel of the planetary gear to be mounted in a rotationally fixed fashion or to be mounted in a rotatable fashion at a settable speed, in order to enable the time required for complete transport of solids to be varied.

The connection between the rotating spindle and the planetary gear is produced in a particularly simple fashion when the rotating spindle has a cavity forming a housing for the planetary gear.

An inlet for the liquid-solid mixture is preferably arranged concentrically with the axis of the casing wall. The axis of the casing wall is expediently vertical, so that the liquid-solid mixture contained in the centrifuge scarcely effects imbalances when the centrifuge is started or switched off. Furthermore, gravity can be utilized to introduce the liquid-solid mixture. In this case, it is advantageous for the subsequent acceleration of the liquid-solid mixture that a rotating distributor plate is arranged below the inlet for the material transported through the inlet.

The distributor plate is preferably constructed as the floor of a rotating cavity, which includes exit openings of the inlet and has radial openings.

The material introduced is advantageously preaccelerated and guided onto the casing inner wall without rolling up the already precipitated solids on the casing inner wall when an inclined, annular chute for the material emerging from the radial openings surrounds the cavity and guides the material obliquely onto the casing inner wall.

The chute is preferably connected to the worm and ends radially outside approximately at the transition between the cylindrical part and the conical part of the casing wall.

Although the construction of the centrifuge is possible with sieve-like walls, it is preferred that the casing wall is part of a drum with impervious walls and has a cylindrical part which is adjoined by a conically tapering part, a liquids exit opening is located radially inwardly at a distance from the casing inner wall, and the solids exit opening is arranged in, or adjacent to the conical part located further radially inwardly than the radially outer rim of the liquids exit opening. In the cylindrical part of the drum, the solids of the liquid-solid mixture are precipitated on the casing inner wall.

This precipitation is effected by the centrifugal forces which are produced by the higher density of the solids with respect to the liquid. The liquid forms a bath on the casing inner wall of the drum. The depth of the bath is prescribed by the distance of the radially outer rim of the liquids exit opening of the casing inner wall. As soon as the radially internal surface of the liquid reaches this outer rim, it drains clarified from the drum. The precipitated solids are transported by the worm to the solids exit opening. It is advantageous that the solids exit opening is located further inwardly radially than the radially outer rim of the liquids exit opening, since then the solids are dried in the conical part as soon as they are located radially inwardly outside the liquid bath.

A preferred embodiment is realized when the solids exit opening is located at the end of the conical part of the casing wall pointing away from the cylindrical part.

The liquids exit opening is preferably arranged in an end wall of the drum. In a structurally simple embodiment, the drum is surrounded by a stationary housing. An inlet is located in the housing, and the drive is fastened to the housing.

When the solids are ejected from the housing they should not be able to fall back into the clarified liquid. For this purpose and in order to guide the drum, it is advantageous when the stationary housing has a solids exit opening radially outside on an annular duct in which stepped plates of the casing wall rotate and into which the solids exit opening of the drum opens. The stepped plates of the casing wall are annularly constructed and engage in the annular duct so as to produce a labyrinth packing. In order to produce an air current, it is expedient to fasten to the annular stepped plates air blades which effectively support the transport of the solids to the liquids exit opening through an annular air current.

Turning now to the drawings, the centrifuge represented in FIG. 1 has a drum 1 with mutually parallel end walls 2 and a casing wall 3 which consists of a cylindrical part 4 and a part 5 tapering conically upwardly. Solids exit openings 6 can be seen in the drum 1 at the transition between the conical part 5 and the upper end wall 2. The arrangement of the solids exit openings 6 at the upper end of the conical part 5 serves the purpose of achieving as long a drying phase as possible.

The centrifuge furthermore has a transport device 7, realized in the form of a worm 8, which sweeps the casing inner wall 9 for the purpose of transporting the solids. In a narrow region, the rim of the worm 8 ends at a minimum distance 10 in front of the casing inner wall 9. During operation, the narrow region, which ends at a minimum distance 10 in front of the casing inner wall 9, moves upwardly from below on a section of a helical curve along the casing inner wall 9 on strips 11. This effects the transport of the solids to the solids exit opening 6. The drum 1, whose axis of rotation is vertical, has a liquids exit opening 12 in its lower end wall 2. The liquid forms a bath on the casing inner wall 9 and runs off via the radially outer rim of the liquids exit opening 12.

Two eccentric bearings 13 are fastened to a spindle 16; around them the worm 8 rotates together with a cylindrical fastening 14 having end flanges 15. Because of the eccentric bearings 13, it is only ever a narrow region of the worm 8 that is located at a minimum distance 10 in front of the casing inner wall 9. The result of the different rotational speeds of worm 8 and drum 1 is that the narrow region in which the worm 8 is at a minimum distance 10 from the casing inner wall 9 assumes the shape of a helical curve on the casing inner wall 9 of the drum 1, while the entire arrangement rotates with the rotational speed of the spindle 16. Inside the conical part 5 of the drum 1, the worm 8 likewise extends conically, so that the solids are transported in both parts of the drum 1. The spindle 16 is connected via a coupling 17 to a drive 18. The axes of rotation of the spindle 16 and the drum 1 coincide. The drum can turn and rotate about the spindle 16 in two bearings 19 on the upper and lower end of the spindle 16. Via a planetary gear arrangement (not shown in detail) 20 and a shaft 21 driven by toothed gearing, the spindle 16 produces the transmission of power from the drive 18 onto the drum 1 and the worm 8. The shaft 21 driven by toothed gearing rotates with the spindle 16 and is mounted by means of two bearings 19' above and below the toothed wheel 22 fastened to it. The shaft has teeth 23 rotating on its ends, in which a toothed ring wheel 24 fastened to the drum 1 meshes externally radially and a toothed wheel 22' fastened to the worm 8 meshes internally radially. The ratio of the number of the teeth of the ring wheel 24 to that of the toothed wheel 22' fastened to the worm 8 is chosen such that the same regions of the rotating components are not located opposite one another again until after a multiplicity of rotations of the worm 8 about the drum 1. In a preferred embodiment, a number of 179 teeth has been chosen for the ring wheel 24, and a number of 143 teeth for the toothed wheel 22'. The specific choice of the teeth fixes the angle by which a strip 11 is offset with respect to a preceding strip 11. The worm 8 and the drum 1 can execute a relative movement with respect to one another, owing to the engagement on radially opposite sides of the shaft 21 driven by toothed gearing, which rotates at a slow rotational speed. Represented between the ring wheel 24,and the lower end wall 2 of the drum 1 are recesses 25 which allow any contaminants to escape radially outwardly, in order not to obstruct the meshing of the ring wheel 24 and the shaft 21.

The toothed wheel 22 fastened to the shaft 21 engages in a further toothed wheel, constructed as a planet wheel 26. This planet wheel 26 projects axially downwardly from a planet housing 27, which for its part is in turn constructed as a planet wheel and is rigidly connected to the spindle 16. The sun wheel 28 of the planetary gear arrangement 20 has a connection to a concentric inlet 29 which is fastened in a cylindrical housing 30. The planet wheel 26 projecting from the planet housing 27 turns with a different rotational speed than the planet housing 27. Via a toothed wheel 22, the planet wheel 26 drives the shaft 21, which is mounted in the spindle 16, and causes spindle 16, worm 8 and drum 1 to rotate at slightly different rotational speeds.

The liquid-solid mixture 32 emerges from exit openings 31 in the inlet 29 into a cavity 33 whose floor 34 is constructed as a distributor plate, and is accelerated there in the radial direction. The liquid-solid mixture 32 impinges on inclined chutes 36, which are fastened to the worm 8, from radial openings 35 of the cavity 33. The chutes 36 point radially outwardly and end in the region of the transition between the cylindrical part 4 and the conical part 5 of the casing wall 3. The liquid-solid mixture 32 is further accelerated by these chutes 36, so that the impingement on the casing inner wall 9 produces only slight turbulence of the already precipitated solids. The chutes 36 have recesses 37 through which the worm 8 projects.

Radial annular stepped plates 38 on the conical part 5 of the drum 1 engage in an annular duct 39 provided on the upper part of the housing 30 in the interior, and have a labyrinth packing 40 with said annular duct, which prevents the already ejected solids from falling back into the decanted liquid in the lower part of the housing 30. The transport of the solids to the solids exit opening 6 in the housing 30 is performed by airblades 41 which accelerate the air above the annular duct 39. Owing to irregular emergence of the solids, it is possible for the air blades 41 to touch the solids, so that the latter are transported not only by the air sweeping by, but directly by the air blades 41. A discharge opening 43 for the decanted liquid can be seen in the lower end wall 2 of the housing 30 which stands on pillar-shaped feet 42.

Figure 2:
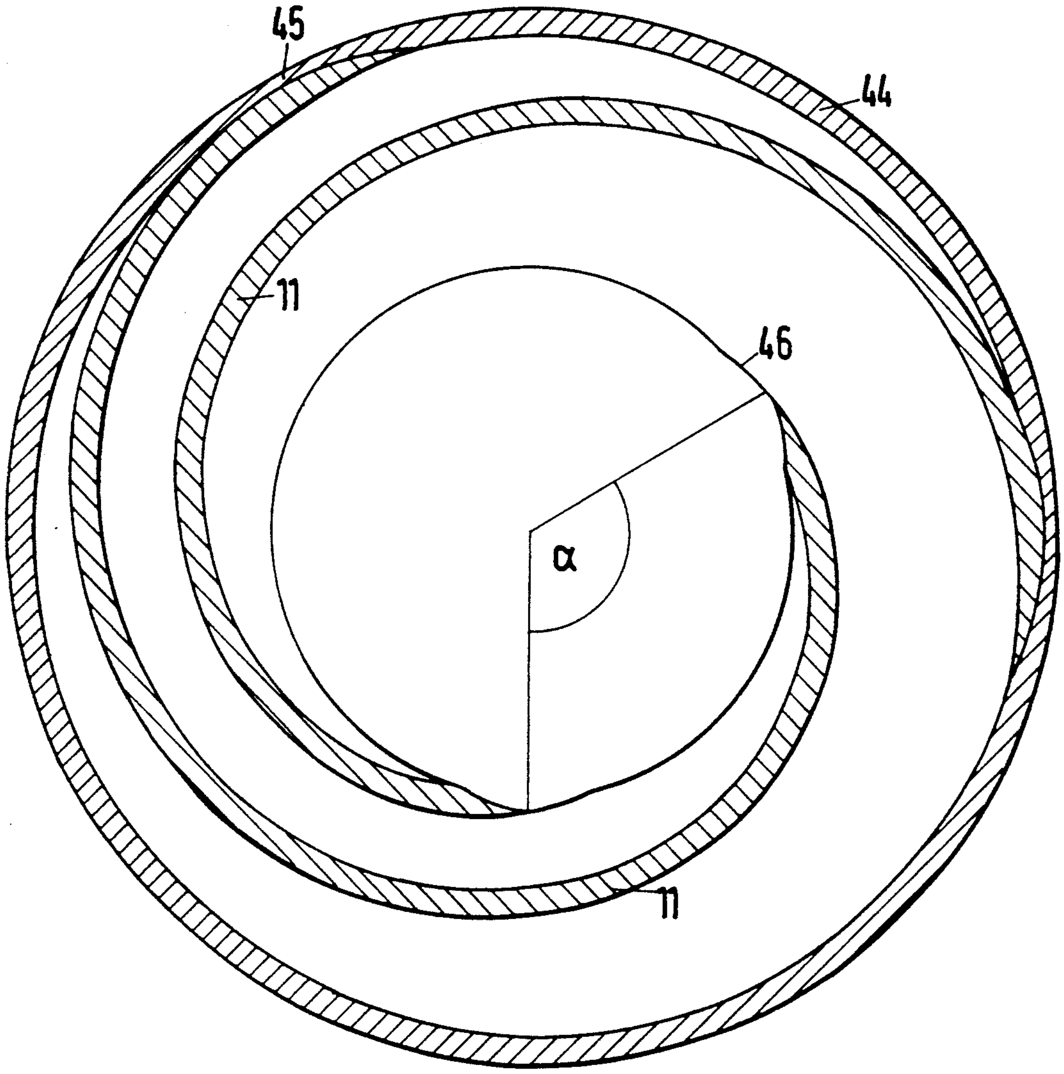
FIG. 2 shows a perspective internal view of the cylindrical part of the drum.

FIG. 2 shows, in a diagrammatic perspective internal view, the precipitated solids 44 which adhere to the casing inner wall 9 in the cylindrical part 4 of the drum 1 (not represented here). Visible in these precipitated solids 44 are two strips 11 which were left behind by the movement of the narrow region of the worm 8 in the precipitated solids 44. Owing to the minimum distance 10, a minimum layer 45 of precipitated solids 44 still remains even in the swept part of the drum 1. The depth of the minimum layer 45 remaining is determined by the length of the minimum distance 10. In preferred embodiments, a minimum distance 10 can be chosen between 1 mm and 5 mm. Offsetting a strip 11 by an angle with respect to the preceding strip results in the casing inner wall 9 being completely cleared after a multiplicity of rotations of the worm 8 relative to the drum. The strips 11 have a round profile 46 in the precipitated solids 44. The length of arc of the round profile 46 depends on the depth of the precipitated solids 44. Furthermore, even after a few rotations of the worm 8 about the drum 1, individual strips 11 can overlap in parts of their round profiles.

What is claimed is:

1. A centrifuge, comprising:

a rotating casing wall having a solids exit opening therein; and a transport device which sweeps the casing inner wall towards the solids exit opening for the purpose of removing solids, wherein the transport device comprises a eccentrically mounted worm, ending in a narrow region positioned at a preselected minimum distance in front of the casing inner wall, for sweeping the casing inner wall with said narrow region in strips up to the solids exit opening, and means for producing a relative movement of said eccentrically mounted worm with respect to the rotating casing inner wall.

2. The centrifuge as claimed in claim 1, wherein the an eccentrically mounted worm rotates at a low speed relative to the rotating casing.

3. The centrifuge as claimed in claim 2, wherein the worm comprises a complete worm thread.

4. The centrifuge as claimed in claim 2, further comprising a common drive means for driving the worm and the casing wall.

5. The centrifuge as claimed in claim 4, further comprising a spindle, and wherein the drive means is connected to said spindle, whereby rotation of said spindle causes rotation of the worm and of the casing wall.

6. The centrifuge as claimed in claim 5, wherein said drive means comprises an eccentric shaft which rotates at a low speed about its axis together with the spindle and drives both the worm and the casing wall in a rotary fashion.

7. The centrifuge as claimed in claim 6, wherein said drive means comprises means for driving the worm and the casing wall with the sum and the difference of the speeds of the eccentric shaft and spindle.

8. The centrifuge as claimed in claim 7, wherein the eccentric shaft, the worm and the casing wall have teeth, and the teeth of the casing wall and worm mesh with the teeth of the shaft in a radially external or radially internal fashion.

9. The centrifuge as claimed in claim 8, wherein the shaft has teeth at its ends in each case.

10. The centrifuge as claimed in claim 4, wherein the drive means includes a planetary gear arrangement having an output drive with a planet wheel, said planet wheel being driven by the rotating spindle and driving said eccentric shaft.

11. The centrifuge as claimed in claim 10, wherein the planetary gear arrangement has a sun wheel mounted in a rotationally fixed fashion.

12. The centrifuge as claimed in claim 10, wherein the planetary gear arrangement has a rotatable sun wheel and means for setting the speed of rotation of said sun wheel.

13. The centrifuge as claimed in claim 10, wherein the rotating spindle has a cavity forming a housing (27) for the planetary gear arrangement.

14. The centrifuge as claimed in claim 4, further comprising an inlet arranged concentrically with the axis of the casing wall.

15. The centrifuge as claimed in claim 14, wherein the axis of the casing wall is vertical, and further comprising a rotating distributor plate arranged below the inlet for the material transported through the inlet.

16. The centrifuge as claimed in claim 15, wherein the distributor plate forms a floor of a rotating cavity which includes exit openings of the inlet and has radial openings.

17. The centrifuge as claimed in claim 21, further comprising an inclined, annular chute for material emerging from the radial openings, said chute surrounding the cavity and guiding the material obliquely onto the casing inner wall.

18. The centrifuge as claimed in claim 17, wherein the chute is connected to the worm so as to rotate together with the worm.

19. The centrifuge as claimed in claim 17, wherein the casing wall is part of a drum with impervious walls and has a cylindrical part which is adjoined by a conically tapering part, wherein a liquids exit opening is located radially inwardly at a distance from the casing inner wall, and wherein the solids exit opening is arranged in, or adjacent to the conical part located further radially inwardly than the radially outer rim of the liquids exit opening.

20. The centrifuge as claimed in claim 19, wherein the solids exit opening is located at the end of the conical part of the casing wall pointing away from the cylindrical part.

21. The centrifuge as claimed in claim 19, wherein the liquids exit opening is arranged in an end wall of the drum.

22. The centrifuge as claimed in claim 19, wherein the inclined chute ends radially outside approximately at the transition between the cylindrical part and the conical part of the casing wall.

23. The centrifuge as claimed in claim 14, wherein the drum is surrounded by a stationary housing to which the inlet and the driving means are fastened.

24. The centrifuge as claimed in claim 23, wherein the stationary housing concentrically surrounds the casing wall.

25. The centrifuge as claimed in claim 24, wherein the stationary housing has a solids exit opening radially outside on an annular duct in which stepped plates of the casing wall rotate and into which the solids exit opening of the drum opens.

* * * * *